United States Patent
Chen et al.

(10) Patent No.: US 10,148,719 B2
(45) Date of Patent: Dec. 4, 2018

(54) USING ANCHORS FOR RELIABLE STREAM PROCESSING

(71) Applicant: Microsoft Technology Licensing, LLC, Redmond, WA (US)

(72) Inventors: Zhong Chen, Medina, WA (US); Lev Novik, Bellevue, WA (US); Boris Shulman, Bellevue, WA (US); Clemens A. Szyperski, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 180 days.

(21) Appl. No.: 14/732,416

(22) Filed: Jun. 5, 2015

(65) Prior Publication Data

US 2016/0359940 A1     Dec. 8, 2016

(51) Int. Cl.
*G06F 15/16*     (2006.01)
*H04L 29/06*     (2006.01)

(52) U.S. Cl.
CPC ........ *H04L 65/604* (2013.01); *H04L 65/4069* (2013.01)

(58) Field of Classification Search
CPC .......................... H04L 65/604; H04L 65/4069
USPC ........................................ 709/203, 219, 230
See application file for complete search history.

(56) References Cited

U.S. PATENT DOCUMENTS

| | | | |
|---|---|---|---|
| 5,625,788 A | 4/1997 | Boggs et al. | |
| 5,696,958 A | 12/1997 | Mowry et al. | |
| 5,721,855 A | 2/1998 | Hinton et al. | |
| 5,889,982 A | 3/1999 | Rodgers et al. | |
| 6,128,649 A | 10/2000 | Smith et al. | |
| 6,449,618 B1 | 9/2002 | Blott et al. | |
| 6,516,310 B2 | 2/2003 | Paulley | |
| 6,625,150 B1 | 9/2003 | Yu | |
| 6,820,121 B1 | 11/2004 | Callis et al. | |
| 7,010,538 B1 | 3/2006 | Black | |
| 7,251,747 B1 * | 7/2007 | Bean | G06F 11/1443 714/15 |
| 7,603,488 B1 | 10/2009 | Gravenstein et al. | |
| 7,680,830 B1 | 3/2010 | Ohr et al. | |
| 7,738,380 B1 | 6/2010 | Dubrovsky et al. | |

(Continued)

FOREIGN PATENT DOCUMENTS

| | | |
|---|---|---|
| WO | 2014052917 A1 | 4/2014 |
| WO | 2015070232 A1 | 5/2015 |

OTHER PUBLICATIONS

"Azure Stream Analytics Developer Guide", Retrieved on: Apr. 8, 2015 Available at: http://azure.microsoft.com/en-in/documentation/articles/stream-analytics-developer-guide/.

(Continued)

*Primary Examiner* — Duyen M Doan

(57) ABSTRACT

Stream processing can be performed using a pull-based, anchor-based methodology that guarantees once and only once processing and repeatability of the creation of output with no additional communication overhead during normal processing. Each node (computing device) in the graph (representing interconnected computing devices) establishes a system of anchors. An anchor describes a point in the output stream of the node, so that every event in the stream is either before or after any given anchor.

19 Claims, 6 Drawing Sheets

(56) References Cited

U.S. PATENT DOCUMENTS

| | | | |
|---|---|---|---|
| 7,769,015 | B2 | 8/2010 | Huang et al. |
| 8,001,309 | B2 | 8/2011 | Patzelt et al. |
| 8,219,848 | B2 | 7/2012 | Branson et al. |
| 8,392,381 | B2 | 3/2013 | Al-Kateb et al. |
| 8,417,690 | B2 | 4/2013 | Poppe et al. |
| 8,797,867 | B1 | 8/2014 | Chen et al. |
| 8,812,487 | B2 | 8/2014 | Krishnamurthy et al. |
| 8,949,194 | B1 | 2/2015 | Mehlum et al. |
| 8,949,801 | B2 | 2/2015 | Andrade et al. |
| 9,880,769 | B2 | 1/2018 | Chen et al. |
| 9,942,272 | B2 | 4/2018 | Chen et al. |
| 2002/0010804 | A1 | 1/2002 | Sanghvi et al. |
| 2002/0184159 | A1* | 12/2002 | Tadayon .............. G06Q 10/10 705/54 |
| 2004/0103256 | A1 | 5/2004 | Flores et al. |
| 2004/0219925 | A1* | 11/2004 | Ahya .................. H04W 72/044 455/450 |
| 2005/0281279 | A1 | 12/2005 | Dennison et al. |
| 2006/0143170 | A1 | 6/2006 | Ganguly et al. |
| 2006/0195309 | A1 | 8/2006 | Stokkan et al. |
| 2006/0004597 | A1 | 12/2006 | Charters |
| 2007/0180533 | A1 | 8/2007 | Ramaiah et al. |
| 2008/0005391 | A1 | 1/2008 | Gedik et al. |
| 2008/0162666 | A1* | 7/2008 | Ebihara ................. H04L 67/06 709/217 |
| 2008/0270640 | A1 | 10/2008 | Gedik et al. |
| 2009/0157895 | A1 | 6/2009 | VanDenBerghe |
| 2009/0307053 | A1 | 12/2009 | Steelberg et al. |
| 2010/0049973 | A1 | 2/2010 | Chen |
| 2010/0254462 | A1 | 10/2010 | Friedrich et al. |
| 2011/0063303 | A1* | 3/2011 | Choi ............... H04M 1/274516 345/501 |
| 2011/0066746 | A1* | 3/2011 | Bennett ............ H04N 21/26616 709/231 |
| 2012/0005564 | A1* | 1/2012 | Tsubaki ............ G06F 17/30905 715/204 |
| 2013/0132978 | A1 | 5/2013 | Opher et al. |
| 2013/0166617 | A1 | 6/2013 | Branson et al. |
| 2014/0016501 | A1 | 1/2014 | Kamath et al. |
| 2014/0201225 | A1 | 7/2014 | Deshmukh et al. |
| 2014/0215184 | A1 | 7/2014 | Branson et al. |
| 2014/0226469 | A1 | 8/2014 | Chen et al. |
| 2015/0134796 | A1 | 12/2015 | Theimer et al. |
| 2016/0357476 | A1 | 12/2016 | Chen et al. |
| 2016/0359910 | A1 | 12/2016 | Chen et al. |
| 2017/0012861 | A1 | 1/2017 | Blumenthal et al. |

OTHER PUBLICATIONS

Mumian, et al., "Introduction to Azure Stream Analytics", Published on: Mar. 21, 2015 Available at: http://azure.microsoft.com/en-us/documentation/articles/stream-analytics-introduction/.

Babu, et al., "Exploiting k-Constraints to Reduce Memory Overhead in Continuous Queries over Data Streams", In Proceedings of ACM Transactions on Database Systems (TODS), vol. 29 Issue 3, Sep. 2004, 28 pages.

Ding, et al., "MJoin: A Metadata•Aware Stream Join Operator", In Proceedings of the 2nd International Workshop on Distributed Event-Based Systems, Jun. 8, 2003, 8 pages.

Dash, et al., "Delivering QOS in Xml Data Stream Processing Using Load Shedding", In Proceedings of International Journal of Database Management Systems, vol. 4, Issue.3, Jun. 2012, 23 pages.

Gu, et al., "Adaptive Load Diffusion for Stream Joins", In Proceedings of the ACM/IFIP/USENIX International Conference on Middleware, Nov. 2005, 10 pages.

Ananthanarayanan, et al., "Photon: Fault-tolerant and Scalable Joining of Continuous Data Streams", In Proceedings of ACM SIGMOD International Conference on Management of Data, Jun. 22, 2013, 12 pages.

Asha, et al., "Adaptive Join Operators for Result Rate Optimization on Streaming Inputs", In Proceedings of International Journal of Engineering Trends and Technology, May 2011, 5 pages.

"SAS® Event Stream Processing Engine", Published on: Nov. 12, 2014 Available at: http://www.sas.com/content/dam/SAS/en_us/doc/factsheet/event-stream-processing-engine-106151.pdf, 4 pages.

Li, et al., "Event Stream Processing with Out-of-Order Data Arrival", In Proceedings of the 27th International Conference on Distributed Computing Systems Workshops, Jun. 22, 2007, 8 pages.

Keckler, et al., "Concurrent Event Handling Through Multithreading", In Proceedings of IEEE Transactions on Computers, vol. 48, Issue 9, Sep. 1999, 14 pages.

Heinze, et al., "Latency-Aware Elastic Scaling for Distributed Data Stream Processing Systems", In Proceedings of the 8th ACM International Conference on Distributed Event-Based Systems, May 26, 2014, 10 pages.

Francisci Morales, Gianmarco De, "Distributed Stream Processing Showdown: S4 vs Storm", Published on: Jan. 2, 2013 Available at: http://gdfm.me/2013/01/02/distributed-stream-processing-showdown-s4-vs-storm/, 5 pages.

Akidau, et al., "MillWheel: Fault-Tolerant Stream Processing at Internet Scale", In Proceedings of the VLDB Endowment, vol. 6, Issue 11, Aug. 26, 2013, 12 pages.

Hwang, et al., "High-Availability Algorithms for Distributed Stream Processing", In Proceedings of the 21st International Conference on Data Engineering, Apr. 5, 2005, 12 pages.

Hu, et al., "ELF: Efficient Lightweight Fast Stream Processing at Scale", In Proceedings of USENIX ATC Annual Technical Conference, Jun. 19, 2014, 13 pages.

Brito, et al., "Scalable and Low-Latency Data Processing with Stream MapReduce", In Proceedings of IEEE Third International Conference on Cloud Computing Technology and Science, Nov. 29, 2011, 15 pages.

Hwang, et al., "A Comparison of Stream-Oriented High-Availability Algorithms", In Technical Report, Jun. 5, 2003, 13 pages.

Kamburugamuve, Supun, "Survey of Distributed Stream Processing for Large Stream Sources", In Technical Report, Dec. 14, 2013, 16 pages.

"Samza", Retrieved on: Jun. 5, 2015, Available at: http://samza.apache.org/learn/documentation/0.7.0/container/checkpointing.html, 4 pages.

Bockermann, Christian, "A Survey of the Stream Processing Landscap", In Technical Report, May 16, 2014, 47 pages.

Branson, et al., "CLASP: Collaborating, Autonomous Stream Processing Systems", In Proceedings of ACM/IFIP/USENIX 8th International Middleware Conference, Nov. 26, 2007, 20 pages.

Sattler, et al., "Towards Elastic Stream Processing: Patterns and Infrastructure", In Proceedings of the First International Workshop on Big Dynamic Distributed Data, 14 pages.

Liu, et al., "SAND: A Fault-Tolerant Streaming Architecture for Network Traffic Analytics", In Proceedings of 44th Annual IEEE/IFIP International Conference on Dependable Systems and Networks, Jun. 23, 2014, 8 pages.

"International Preliminary Report on Patentability Issued in PCT Application No. PCT/US2016/035610", dated May 29, 2017, 7 Pages.

Srivastava, et al., "Memory-Limited Execution of Windowed Stream Joins", in Proceedings of the Thirtieth International Conference on Very Large Databases, vol. 30, Aug. 31, 2004, pp. 324-335.

Das, et al., "Approximate Join Processing Over Data Streams", In Proceedings of the ACM SIGMOD International Conference on Management of Data, Jun. 9, 2003, pp. 40-51.

"International Search Report and Written Opinion Issued in PCT Application No. PCT/US2016/035610", dated Sep. 5, 2016, 13 pages.

Gedik, et al. "GrubJoin: An Adaptive, Multi-Way, Windowed Stream Join with Time Correction-Aware CPU Load Shedding", In Proceedings of IEEE Transactions on Knowledge and Data Engineering, vol. 19, Issue 10, Oct. 2, 2007, pp. 1363-1380.

Xie, et al., "A Survey of Join Processing in Data Streams", In Proceedings of Springer Data Streams, vol. 31, Apr. 2, 2007, 27 pages.

"USPTO Non-Final Office Action", dated Jan. 12, 2017, U.S. Appl. No. 14/732,374, filed Jun. 5, 2015, pp. 7.

(56) References Cited

OTHER PUBLICATIONS

"USPTO Notice of Allowance", dated Jun. 2, 2017, U.S. Appl. No. 14/732,374, filed Jun. 5, 2015, pp. 5.
"International Search Report and Written Opinion Issued in PCT Application No. PCT/US2016/035611", dated Sep. 14, 2016, 15 Pages.
"USPTO Non-Final Office Action", dated Jan. 25, 2017, U.S. Appl. No. 14/732,398, filed Jun. 5, 2015, pp. 30.
"Uspto Final Office Action", dated Jul. 7, 2017, U.S. Appl. No. 14/732,398, filed Jun. 5, 2015, pp. 37.

* cited by examiner

USING ANCHORS FOR RELIABLE STREAM PROCESSING

CROSS-REFERENCE TO RELATED APPLICATIONS

The application is related in subject matter to co-pending U.S. patent application Ser. No. 14/732,398 entitled "HANDLING OUT OF ORDER EVENTS", filed on Jun. 5, 2015. The application is related in subject matter to co-pending U.S. patent application Ser. No. 14/732,374 entitled "STREAMING JOINS IN CONSTRAINED MEMORY ENVIRONMENTS", filed on Jun. 5, 2015.

BACKGROUND

In traditional computing a single central processing unit (CPU) sequentially executes a single instruction on a single piece of data in a single stream, executing one operation at a time. As the data processing demands of the world increased, the amount of data to be operated upon exploded.

In stream processing multiple data streams from multiple sources can be processed in real time. "Streaming" or stream processing means receiving streams of data, processing the data and streaming it back out as a single flow.

SUMMARY

Stream processing can be based on anchors. An anchor can represent a (physical) point in a data stream. An anchor can be a list of anchors. A time associated with the anchor can represent a logically-meaningful time value associated with data in the data stream. The data in the data stream can be event data but is not limited to being event data. An anchor describes a point in the output stream of the node, so that every event in the stream is either before or after any given anchor. That is, as used herein, an anchor (A) can be used to partition a stream of data into two portions: the data or events (E) that came before the anchor, and the data or events that came after the anchor. Even though the units of data or events themselves cannot necessarily be compared to other data, any unit of data or event can be compared to any anchor. The less than sign ("<") is used herein to denote that a unit of data or an event precedes an anchor, or that an anchor precedes the unit of data or event. This relation is complete: for any event E and anchor A, either E<A, or A<E. Anchors can be used to read data from streams. Time can be used to initiate operations to generate the results requested.

Stream processing can be performed using a pull-based, anchor-based methodology that guarantees once and only once processing. Repeatability of output can be guaranteed with no additional communication overhead during normal processing. Each node (computing device) in a graph representing interconnected computing devices can establish a system of anchors.

Down-stream nodes can use the anchors of the up-stream nodes to pull data. If an up-stream node is unavailable (e.g., failures, etc.), the anchor supplied by the down-stream node after the restart can tell the down-stream node precisely which events the down-stream node has not yet processed. Similarly, if the down-stream node is unavailable, the down-stream node only needs to read its own state upon recovery and resume pulling data from the up-stream node using its last-used anchor. In this way, no coordination between nodes is assumed in either checkpointing or recovery. Recovery, in the context of streaming computation, encompasses the idea that when a node performing a streaming computation or part of a streaming computation fails and is restarted, it needs to resume its computations from the point at which it failed.

A general methodology for constructing systems of anchors is described in which each anchor has two parts, a transient description of the current point which is used to optimize normal case processing and a durable description of the same point which can be used in the event of a restart. The anchors of input streams can correspond to physical aspects of the stream or combinations of physical aspects of the stream. Examples of physical aspects of a stream include but are not limited to an offset, an arrival time, or a file identifier. The anchors of computing nodes can comprise the anchors of their inputs. Data that precedes the anchor is the data that would be output if the events that precede the input anchors were ingested and all possible processing were performed on them. All kinds of failures can be recovered from, including when multiple failures cause the system to execute along incompatible paths. As used herein "failure" encompasses any crash, or any outage of any sort.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
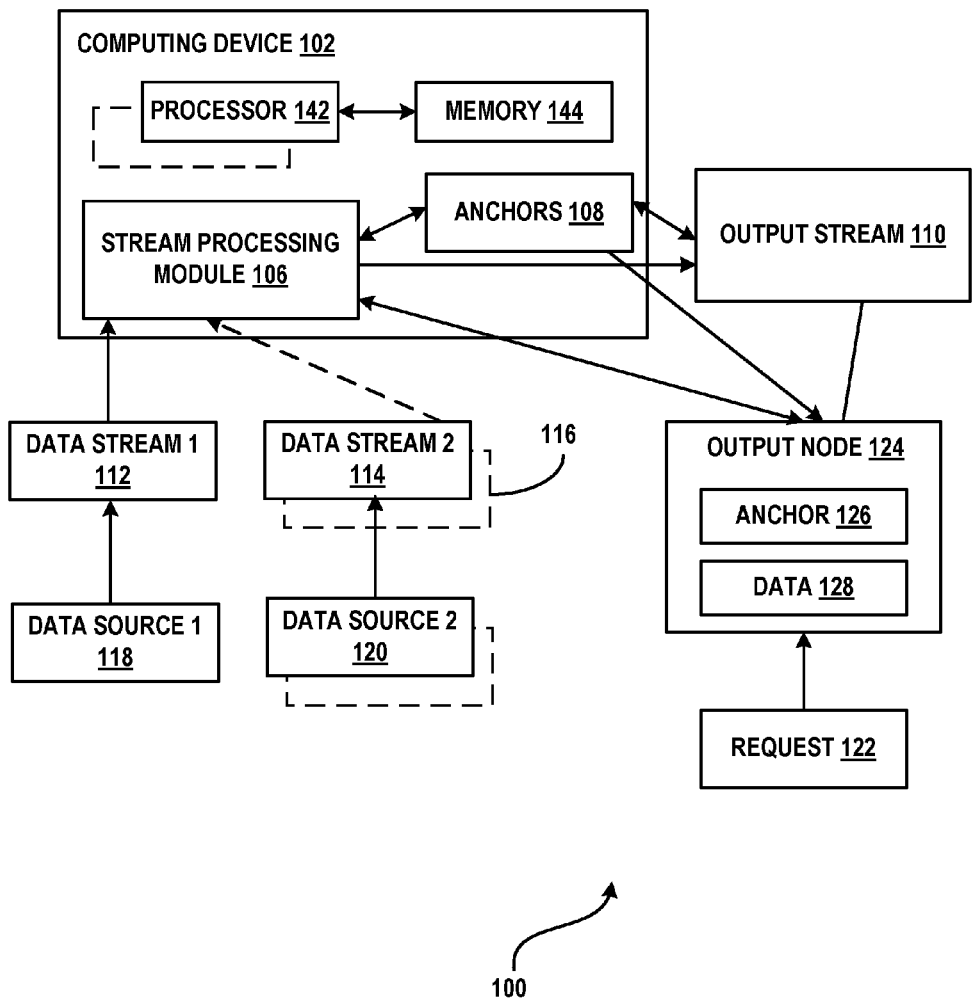
FIG. 1 illustrates a system 100 comprising an example of a system that uses anchors for stream processing in accordance with aspects of the subject matter described herein.

Some stream processing systems process data as it comes in and in the event of a failure, skip any data that was missed. Others use a system of acknowledgements, where subsequent processing nodes send acknowledgements back to the previous nodes and implement duplicate detection schemes.

In accordance with aspects of the subject matter described herein, stream processing is performed using a pull-based, anchor-based methodology that guarantees once and only once processing. Repeatability of output can be guaranteed with no additional communication required for the repeatability guarantee during normal processing. In accordance with some aspects of the subject matter described herein, each node (computing device) in a graph representing interconnected computing devices establishes a system of anchors. An anchor describes a point in the output stream of the node, so that every unit of data in the data stream is either before or after any given anchor.

Down-stream nodes can use the anchors of the up-stream nodes to pull data. If an up-stream node is unavailable (e.g., the up-stream node fails, etc.), the anchor supplied by the down-stream node after the restart will tell the down-stream node precisely which data the down-stream node has not yet processed. Similarly, if the down-stream node is unavailable, the down-stream node only needs to read its own state upon recovery, and resume pulling data from the up-stream node using its last-used anchor. In this way, no coordination between nodes is assumed or needed in either checkpointing or recovery.

A general methodology for constructing systems of anchors is described in which each anchor has two parts. One part comprises a transient description of the current point. The transient description can be used to optimize normal case processing and is typically but not necessarily a simple offset into a buffer. Another part of the anchor comprises a durable description of the current point which can be used in the event of a restart. The anchors of input streams can correspond to physical aspects of the stream or combinations thereof. Examples of physical aspects of a stream include but are not limited to an offset, an arrival time, or a file identifier. The anchors of computing nodes can comprise the anchors of their inputs. Units of data (e.g. events) that precede the anchor are the units of data that would be output if the units of data that precede the input anchor were ingested and all possible processing were performed on them. Note that the above does not dictate the order or the rates at which data is ingested from different inputs. This property enables handling complex event correlation queries with low latency. All kinds of failures can be recovered from, including when multiple failures cause the different parts of the system to execute along incompatible paths.

Advances in time can be incorporated without receipt of additional data required to handle scenarios in which a confirmation is received that a certain time has been reached. Such a confirmation is helpful when processing stream data because otherwise it is difficult to know if all the relevant data has been received or if the arrival of the data has been delayed for some reason.

Using Anchors for Reliable Stream Processing

FIG. 1 illustrates an example of a system 100 that uses anchors for stream processing in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, sensors, and so on. A computing device such as computing device 102 can include one or more processors such as processor 142, etc., and a memory such as memory 144 that communicates with the one or more processors. Computing device 102 may be a device that operates in a constrained memory environment. A constrained memory environment is an environment in which the available memory is not sufficient to handle the demands with which it is faced using more traditional techniques of processing. System 100 may include any one of or any combination of any number of the following: an input node, a computing node, and an output node. An input node is a node that can read or access data from one or more data sources and can generate input for a computing node. A computing node can perform computations on the data as directed. A computing node can be an input node for another computing node. A computing node can generate new data streams. An output node can write the data from the computing node to a data sink (e.g., to storage).

System 100 may include one or more program modules that when loaded into the memory 144 and accessed by the one or more processors such as processor 142, etc., cause the processor to perform the action or actions attributed to the one or more program modules. The one or more program modules (e.g., stream processing module 106) can process streaming data using anchors. Stream processing module 106 may receive one or more data streams such as a first data stream (e.g., data stream 1 112). and/or a second data stream (e.g., data stream 2 114). One or more additional data streams may also be received and processed, represented in FIG. 1 by data stream 116. Data in the data streams may be event data, complex event data, data from databases or any type of data. For example, streaming data can be structured data, security data, measurement data, (e.g., data from a temperature sensing device), log data, sensor data and so on.

Stream processing module 106 may process data from one or more data streams to produce an output stream such as output stream 110. Data can be real time data received in real time or recorded real time data. Each unit of data in the data streams may be associated with a time. The time associated with the data can be a time at which the data was generated. The time associated with the data can be a time at which the data was received. The time associated with the data can be a time at which the data was sent. The time associated with the data can be any other time. Data from the first data stream may originate from a first data source (e.g., data source 1 118). Data from a second data stream may originate from a second data source (e.g., data source 1 120) and so on. One or more data sources may reside on the same computing device as stream processing module 106 or may reside on a different computing device. Similarly, a first data source and a second data source may reside on the same computing device or on a different computing device and so on.

Stream processing can be based on anchors where an anchor (e.g., an input anchor) can represent a (physical) point in a data stream. Anchors can be used to read data from data streams. An anchor (e.g., a computing node anchor) can be a list of anchors. An anchor can be a list of a list of anchors to any level of nesting. Anchors can be created by an input node. Anchors can be created by a computing node. Anchors created by a computing node can be a list of input anchors. Output nodes 124 receive anchors 126 and store them. Stream processing can be based on time where time represents a logically-meaningful time value associated with a unit of data such as but not limited to an event. Time can be used to initiate processing to return requested results. For example, when the data stream comprises a stream of events, an anchor can be used to partition the data stream into two portions: data that came before the anchor, and data that came after the anchor.

Even though the units of data themselves cannot necessarily be compared to each other, any unit of data can be compared to any anchor. The less than sign ("<") is used to denote that a unit of data precedes an anchor, or that an anchor precedes the unit of data. This relation is complete: that is, for any unit of data E and anchor A, either E<A, or A<E. According to some aspects of the subject matter described herein, system 100 can be a system for processing streams using anchors to achieve once and only once output, meaning that no output is lost and that no output is generated twice, even in the event that recovery is performed. The anchor enables any receiver of data to know which data has been processed (the data before the anchor) and which data has not been processed (the data after the anchor).

The computing device that processes an output stream (e.g., an output node 124) can set and store a current (latest-generated) anchor into the output stream so that when a request to continue is received, the computing device can use the current anchor into the output stream to access the unsent results from the output data streams, rather than resending some data 128. This enables the once-and-only once aspect of the subject matter described herein. The node writing the output thus controls what data is send to a requester 122 using anchors. Physical anchors can be used for input data streams. Physical anchors can be physical aspects of the input data stream such as but not limited to an offset into a file. An offset into a file can indicate how many bytes of the file have already been read and/or processed. While not logically meaningful information, this information can enable an input processing program module (input processor) to easily resume stream processing from the exact place at which it left off. An anchor comprising a list of anchors of the input data streams can be used by the node processing the input data streams (the computing node) to generate an anchor 108 for the output of the computing node. This enables the computing node to know where to start processing in the input data stream or streams. It will be appreciated that a relationship is needed between the anchors and the time associated with the data for which output is requested. This enables a requester to make requests such as: "start generating output at 2 pm". A day may also be specified.

In accordance with aspects of the subject matter described herein, various interfaces and/or functions are available to manipulate anchors and to handle requests. It will be appreciated that although the examples below use particular names for interfaces and functions, a particular syntax and use events as the units of data in the data stream, the subject matter described herein is not limited thereto. For example, any suitable syntax in any suitable programming language is contemplated.

Anchors can be used to read data from data streams based on a user-specified time. The user-specified time can be used to initiate operations and/or to generate the results requested by the user. One way to enumerate units of data such as but not limited to events in a data stream given an anchor (startAnchor), is by using an instruction such as:

GetBatch(Anchor startAnchor, out Batch data, out Anchor newAnchor)

Execution of such an instruction can return a batch of events (Batch data) starting from the specified starting anchor (startAnchor). The operation may also return a new anchor (newAnchor) which can allow enumeration of results (Batch data) to continue. When this instruction is executed, all events E in the data stream can be returned such that startAnchor<E<newAnchor. If an event E is not in the data stream but E>startAnchor, then E>newAnchor. guaranteeing that the enumeration is complete.

To begin processing, when a user requests "all output (results) starting at time T or greater (time T (startTime)", an appropriate anchor from which to start enumeration can be obtained by performing an instruction such as:

GetAnchor(DateTime startTime, out Anchor startAnchor)

Execution of the instruction can return a starting anchor (startAnchor) such that all events with a time equal to the specified start time (startTime) or greater can be guaranteed to come after the startAnchor. Note that there may be events with an associated time less than startTime that will come after startAnchor, as well.

A partial order can be determined for the anchors. For example, one anchor (anchor A) is said to precede another anchor (anchor B) (A<=B) if and only if every event E that comes after anchor B also comes after anchor A. For example, it is known that after a call to GetBatch, startAnchor<=newAnchor, anchors can be compared using an instruction such as:

CompareResult Compare(Anchor anchor1, Anchor anchor2)

Possible results are:

A result indicating that anchor 1 precedes anchor 2 (anchor1<=anchor2)

A result indicating that anchor 1 follows anchor2 (anchor2<=anchor1)

A result indicating that anchor 1 is the same as anchor 2 (anchor1=anchor2)

A result indicating that anchor 1 and anchor 2 are not comparable (none of the above)

This function can implement a partition order on the anchors described above. When two anchors are not comparable, a common point in the future can be determined A common point in the future can be determined by executing the operation:

FindCommonFuture(Anchor anchor1, Anchor anchor2, out Anchor futureAnchor)

This function can guarantee that one anchor (anchor1)<=a common anchor point in the future (e.g., futureAnchor) and another anchor (anchor2)<=a future anchor, (futureAnchor).

The functionality of the GetBatch function can be extended so that it can specify not just the lower bound anchor (startAnchor), but also the upper bound anchor (maxAnchor) as follows:

GetBatchUpTo(Anchor startAnchor, Anchor maxAnchor, out Batch data, out Anchor newAnchor)

The semantics of the extended GetBatch function is similar to GetBatch, except that it is guaranteed that the anchor returned (newAnchor)<=the maximum anchor (maxAnchor). The caller has to ensure that startAnchor<=maxAnchor. It will be appreciated that calling GetBatchUpTo repeatedly with the same maxAnchor will eventually result in the current anchor reaching the maximum anchor, and the function returning with newAnchor==maxAnchor and an empty Batch.

For some restarts, an anchor has to be shifted backwards by a specified period of time (a kind of GetAnchor that is relative to another anchor) as illustrated by an instruction such as:

ShiftAnchor (Anchor startAnchor, DateTime shift, out Anchor newAnchor)

This enables the return of an anchor (newAnchor) enumerating from which will include all events that are no more than the shift amount before the events that are included in enumerating from startAnchor. That is, if a first event E>startAnchor and $E^1$ is in the same timeline as E, and the time associated with $E^1$ ($E^1$.time)>=the time associated with E (E.time) minus a shift amount, then $E^1$>the new anchor returned (newAnchor).

Any anchor format can be used with the above instruction, as long as the format selected can implement the described semantics. The anchor is typically but not always a physical data stream pointer (e.g. a sequence number) that is searchable. An example of a form the anchor can take for a computing node having a set of inputs (I1, I2, . . . , Ik) and one output anchor can be:

A list of anchors e.g., (A1, A2, . . . , Ak)
where Ai is an anchor for Ii. The semantics of the list of anchors can be defined as follows:
If all events from input I1 up to A1 are received by the computing node, all events from input I2 up to A2 are fed into the computing node, and so on until all events from input Ik up to Ak are fed into the computing node, and all possible processing associated with the computing node is completed based on the inputs and the results are output, then all of the output produced by the node up to this point can be considered to be before the list of anchors (A1, A2, . . . , Ak). Data not generated up to that point is therefore after the anchor. It will be appreciated that the set of events produced by the computing node, upon being fed the specified data stream segments for all inputs, cannot vary depending on the order in which those events are fed into the node although the sequence can vary because the sequence of events is unrelated to the definition of anchor.

In other words, to start producing output from an anchor comprising a list of anchors (A1, A2, . . . , Ak), all the data up to A1, A2, and up to Ak can be fed into the corresponding inputs of the computing node, the computing node's output can be discarded and new events can be continued to be fed across all inputs into the computing node. In response all the generated output can be sent on to the down-stream node. The computing node needs to be able to handle all of the above methods in all situations, as described below.

In accordance with aspects of the subject matter described herein, for an operation that compares anchors, such as an operation CompareAnchor, each of the anchors can be a k-tuple of the input anchors, so that a list of input anchors (A1, A2, . . . , Ak) can be compared with another list of input anchors (B1, B2, . . . , Bk). Corresponding inputs can be compared. For example, A1 can be compared to B1 and so on until finally Ak is compared to Bk (e.g., Ai to Bi for all i). If for all the comparisons the anchors are the same (identical) a result so indicating can be returned. If all the comparisons indicate that the anchors in a first list either precede or are the same as the anchors in the second list, a result indicating that the anchors in the first list precede the anchors in the second list can be returned. If all comparisons return a result that the anchors in the first list either follow or are the same as the anchors in the second list, a result indicating that the anchors in the first list follow the anchors in the second list can be returned. Otherwise a result indicating that the lists are not comparable can be returned.

In an instruction that finds a common future for lists of anchors an instruction such as FindCommonFuture can be used in which the inputs can be called to find a common future Fi for Ai and Bi for all i. The common future for the vector is the vector of Fi.

Operations that enable a relationship between a time associated with the data and an anchor for the data are now described. The compiler can be asked for the time shift required. Alternatively the time shift can be provided per-input data stream. Then an instruction such as GetAnchor described above can be called on each input with the adjusted time, and a vector of responses can be composed. An instruction such as ShiftAnchor can be called on each input with the specified shift, and a vector of responses can be composed.

GetBatch: While it is possible to only generate the output when a call to GetBatch is received, such behavior is often inefficient. A node can use a background "producer" thread that can deposit output into a buffer, to be retrieved by a subsequent instruction such as GetBatch. Because anchors cannot be derived from events, the output buffer can include well-defined batches: (startAnchor, Batch, endAnchor). The batches can be chained so endAnchor/startAnchor pairs can be fused if desired. GetBatch can look for its desired startAnchor in the output buffer, pick up as many batches as needed to fill its buffer, and return the endAnchor of the last one as newAnchor. If maxAnchor is specified, it will only pick up the batches as long as endAnchor<maxAnchor.

Note that the producer thread cannot simply start from some point in time, and start producing the output stream. As there can be many different orders in which the inputs could be read, producing a different order of outputs, if the producer operates independently of consumers it may never "connect" to their desired anchors, and if it does not, it will not allow them to resume processing. To address this issue, the consumers (callers of GetBatch) can leave a list of points (anchors) that they want the producer thread to connect to. The list of points provides a "trail of breadcrumbs" for the producer to follow. Because the list of points represents what the consumers (the callers of GetNext) want, they need not be stored persistently.

The producer thread can execute along the list of anchors by following sequentially from one anchor to the next. Except at the very beginning, the producer thread will also have the current anchor. Suppose that the list of anchors is A, B, C, D. The producer can start at A by initializing from a checkpoint. A checkpoint can provide a snapshot of the data within the data stream. A checkpoint, in general, is any identifier or other reference that identifies the state of the data at a point in time. A checkpoint differs from an anchor in that an anchor identifies a point in a data stream. An anchor does not include state of the data. The anchor from the checkpoint can become the current anchor. GetBatchUpTo can be called on all inputs i with max=Ai. All output can be discarded. The producer can proceed to B by calling GetBatchUpTo on all inputs i with max=Bi. Periodically the output can be produced and deposited into the output buffer with the corresponding anchor pairs. The producer can then proceed to C and D in the same way. The above process is valid when Ci>Bi. If it is not, the producer thread can re-initialize from the checkpoint, proceed directly to C discarding all output and continue from there. Once the thread gets past a point on the list, the point can be removed from the list of anchors. When the producer gets to D, it will can continue generating output, this time with max=null.

To set the points in the list the GetBatch instruction can do the following. When GetBatch is called with a startAnchor that has not been encountered yet, the producing thread can be instructed to generate output for it. There are four possible scenarios. If the point on the list is empty, startAnchor can be added to it. Otherwise, the earliest anchor A in the list can be determined such that startAnchor<A. If such an anchor is found, startAnchor can be inserted prior to A. If such an anchor is not found, it can be determined if startAnchor follows the last anchor in the list. If it does, startAnchor can be appended to the list, and the producer will go there later.

If neither of the above conditions is true, the following can be performed. FindCommonFuture can be called on the last anchor in the list and startAnchor. The result (e.g., F) can be determined and appended to the list. Then startAnchor and then F again can be appended to the list. A reinitialization can be performed because of the switch to startAnchor because startAnchor is not related to the current end, as described above. Subsequently processing can continue F and continue on for both consumers, the one that wanted A (last anchor) and this one (that wanted startAnchor).

In accordance with aspects of the subject matter described herein, each checkpoint can include the anchor (CA) corresponding to this state (in other words, anchors for each input) and the state of the node. The checkpoints may be roughly ordered and indexed on disk by suitable programming A node can delay initialization until the list has somewhere to go (first anchor - - - A). Supplied with A, the node can check all checkpoints starting from the last (most current) one, looking for a checkpoint whose anchor CA<=A. Initialization can proceed from that anchor.

In the event that no such checkpoint is found (e.g., the process ended before the first checkpoint was written), the node can follow the following initialization path, given target anchor A. First the compiler can be called to determine the time shift for this calculation, and the shift can be performed. A ShiftAnchor function can be called (A, shift, out startAnchor) to determine where to start from. Processing can continue as described above: pull all inputs using A as max until A is reached; then start production.

It is still possible that the logical "batch" in the output buffer is too big to be transmitted. This will happen if a single input produces a lot of node output (e.g. aggregation with a huge number of buckets). This case can be handled by transmitting that single Batch from the output buffer in pages. Once the entire entry from the output buffer has been transmitted, its endAnchor can be returned.

Figure 2A:
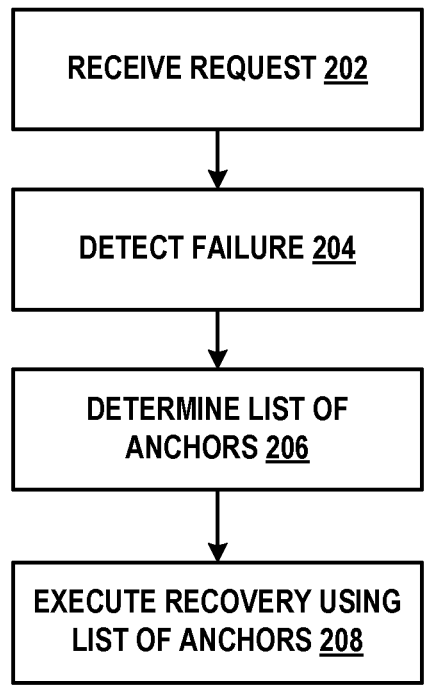
FIG. 2a illustrates an example of a method 200 for using anchors for stream processing recovery in accordance with aspects of the subject matter disclosed herein.

FIG. 2a illustrates an example of a method 200 for using anchors for stream processing recovery in accordance with aspects of the subject matter described herein. The method described in FIG. 2a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 a processing request can be received and stream processing can begin. At operation 204 a failure at one of the processing nodes can be detected. At operation 206 a list of anchors for recovery can be generated. At operation 208 a background producer thread executes the recovery processing by following the list of anchors.

Figure 2B:
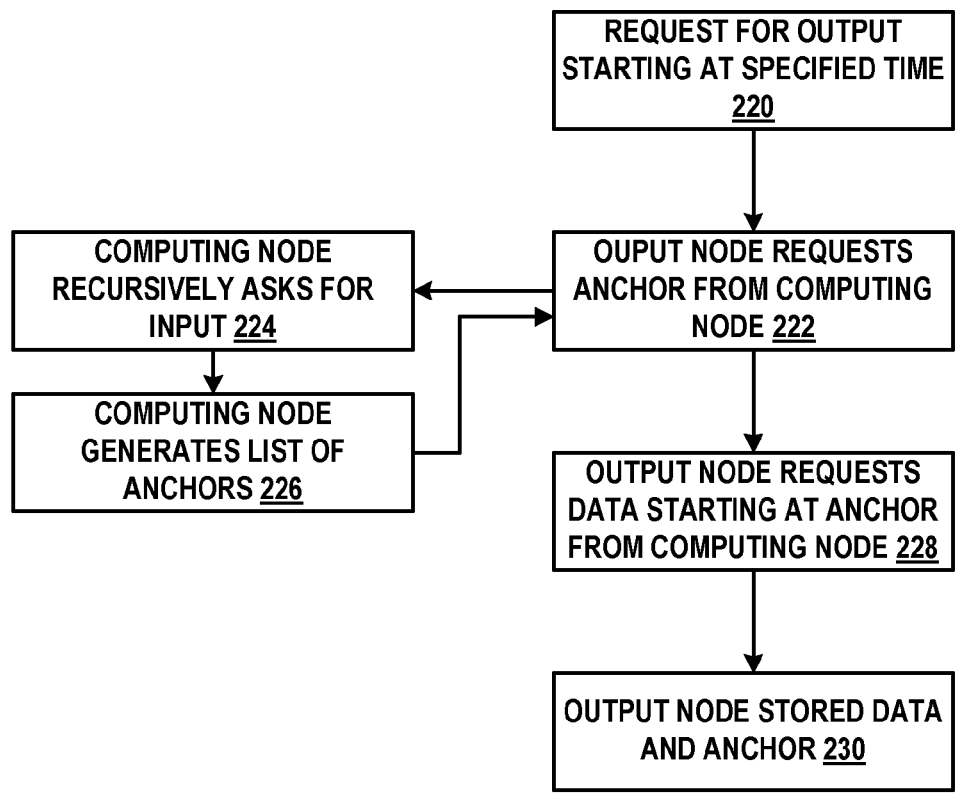
FIG. 2b illustrates an example of a method 201 for retrieving data based on a specified time in accordance with aspects of the subject matter disclosed herein.
Figure 2B:
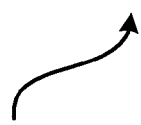

FIG. 2b illustrates an example of a method 201 for using anchors based on a specified time in accordance with aspects of the subject matter described herein. The method described in FIG. 2b can be practiced by a system such as but not limited to the one described with respect to FIG. 1. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 220 a processing request can be received by an output node. The processing request can include a time (e.g., a time associated with the data) for which output data is to start to be produced. At operation 222 an output node can request an anchor from a computing node where the anchor corresponds to a place in the data stream at which the data associated with the time specified in the request begins, with the time associated with the data at which the processing request is to be initiated. It may be difficult or impossible to find an anchor that corresponds precisely to the specified start time. For example, suppose the request asks for all data generated at 2 pm or after. The closest conservative anchor may point to a place in the data stream or file where data generated at 1:55 pm occurs. A conservative anchor as described herein is an anchor that guarantees that no data generated at the specified time (e.g., 2 pm) or after is missed. Some data associated with a time preceding the specified time may be received. In the case of data recorded in files, by selecting all files closed after the selected start time no loss of data occurring at or after the specified start time will occur.

At operation 224 a computing node can recursively ask for input from the appropriate input data streams. At operation 226 the computing node can generate a resulting list of anchors (e.g. using the functions that establish a relationship between a time associated with the data requested and a corresponding anchor for that input data stream (e.g., ShiftAnchor and GetAnchor). Processing can return to operation 222, forming a loop that can be performed as many times as necessary. At operation 228 the output node can request data starting at the anchor received from the computing node. At operation 230 the output node can store the data and the anchor.

Figure 2C:
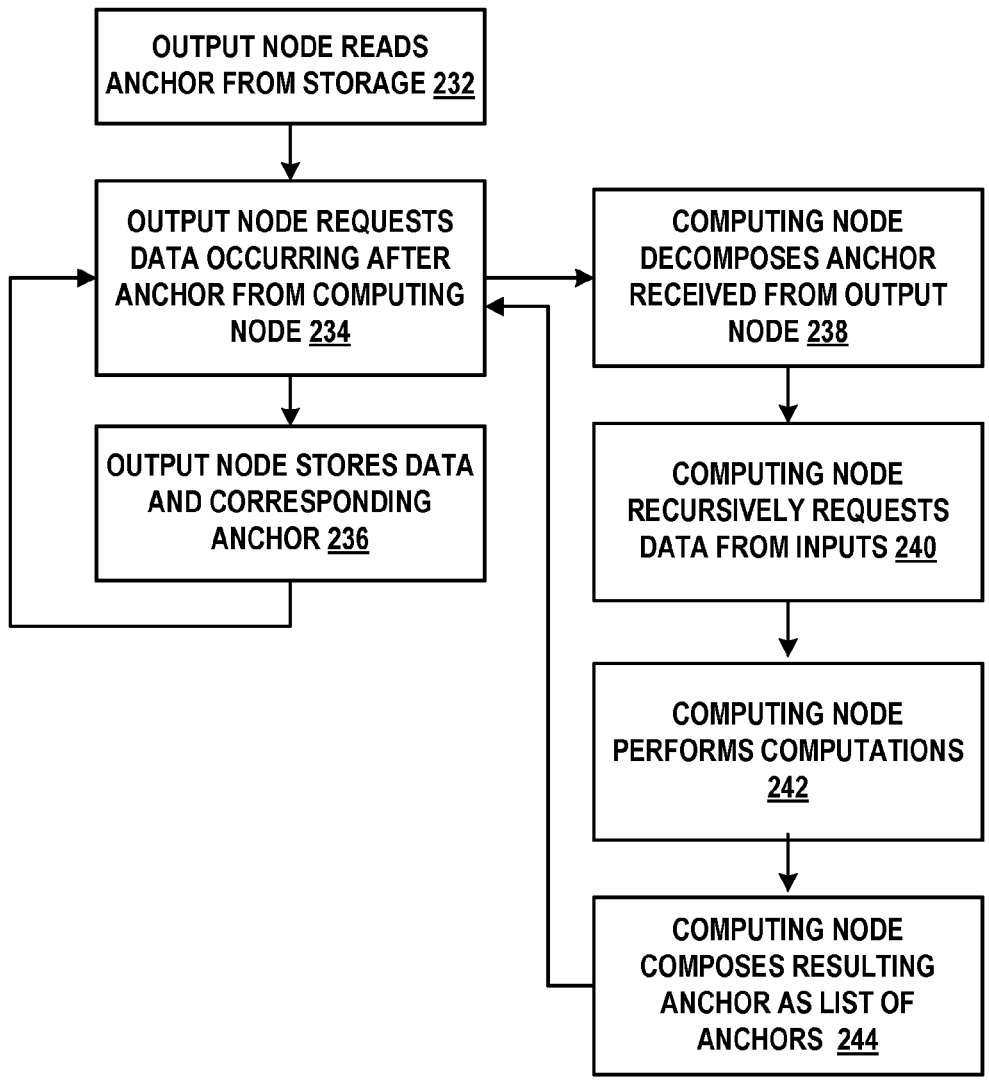
FIG. 2c illustrates an example of a method 203 for once and only once stream processing using anchors in accordance with aspects of the subject matter disclosed herein.

FIG. 2c illustrates an example of a method 203 for using anchors for once and only once stream processing in accordance with aspects of the subject matter described herein. The method described in FIG. 2c can be practiced by a system such as but not limited to the one described with respect to FIG. 1. While method 203 describes a series of operations that are performed in a sequence, it is to be understood that method 203 is not limited by the order of the sequence depicted. For instance, some operations may occur in a different order than that described. In addition, one operation may occur concurrently with another operation. In some instances, not all operations described are performed. In some instances, not all operations performed are illustrated.

Method 203 can be used for recovery. At operation 232 an output node can read an anchor from its storage. At operation 234 the output node can request the data occurring after the anchor from the computing node. At operation 236 in response to receiving data from the computing node, the output node can store the received data and the anchor for the received data. Processing can proceed at operation 234. At operation 238 in response to receiving the anchor from the output node, the computing node can decompose the anchor. Decomposition of the anchor yields one anchor per input to the computing node. That enables the computing node to ask its inputs to start from a particular place (indicated by the corresponding anchor from the list of anchors). At operation 240 the computing node can recursively request data from its inputs. This operation can be applied to a single node or to a chain of nodes. At operation 242 the computing node can perform its computations. At operation 244 the computing node can generate (compose) the resulting anchor as a list of anchors, as described more fully above with respect to a function such as GetAnchor. The computing node can provide the anchor to the output node and processing can proceed from operation 234.

Figure 2D:
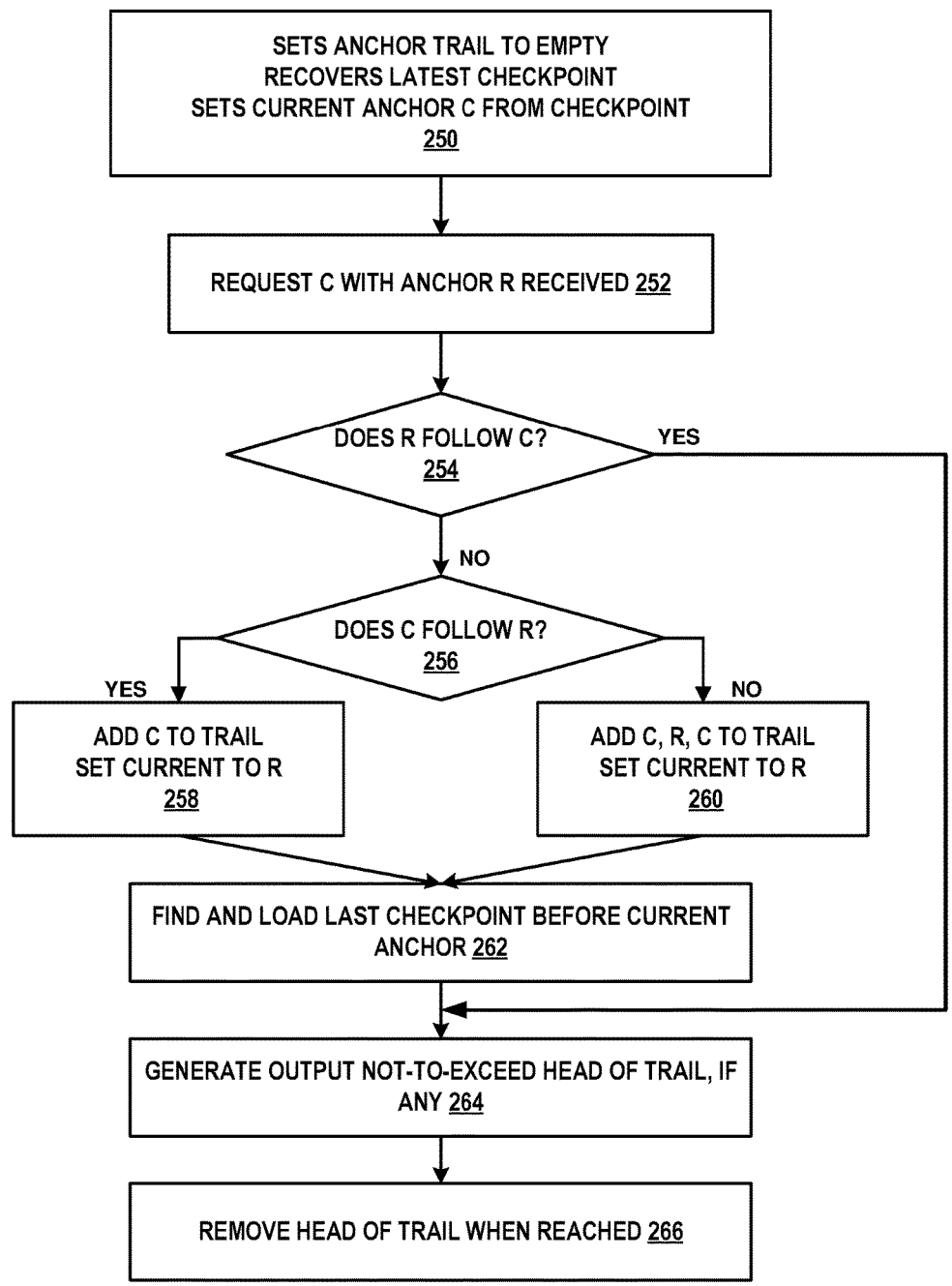
FIG. 2d illustrates an example of a method 205 for recovery using trails of anchors in accordance with aspects of the subject matter disclosed herein.

FIG. 2d illustrates an example of a method 205 for using trails of anchors in recovery in accordance with aspects of the subject matter described herein. The method described in FIG. 2d can be practiced by a system such as but not limited to the one described with respect to FIG. 1. While method 205 describes a series of operations that are performed in a sequence, it is to be understood that method 205 is not limited by the order of the sequence depicted. For instance, some operations may occur in a different order than that described. In addition, one operation may occur concurrently with another operation. In some instances, not all operations described are performed. In some instances, not all operations performed are illustrated.

Method 205 can be used for recovery. Method 205 is especially helpful in complex recovery situations. Method 205 can ensure that when recovery is complete the system has been returned to the pre-outage conditions by ensuring that the input to the recovery process is read in the same order. Method 205 describes how to control the order in which data is pulled so as to produce only and exactly the output that was not produced prior to the outage using anchors. At operation 250 an anchor trail can be set to a value that indicates that the list of anchors in the anchor trail is empty. The latest (most current) checkpoint can be recovered. A current anchor (e.g., current anchor C) can be set using the recovered checkpoint. At operation 252 a request associated with an anchor (e.g., anchor R) can be received. At operation 254 anchor R and current anchor C can be compared. In response to determining that anchor R does not follow current anchor C, processing can proceed at operation 256. At operation 256, current anchor C can be compared with anchor R. In response to determining the current anchor C follows anchor R, current anchor C can be added to the trail and the current anchor C can be set to anchor R.

At operation 262 the last checkpoint before the current anchor C can be found and loaded (e.g., into memory). At operation 264 any output can be generated that does not exceed the head of the trail. (It is possible that no output can be generated.) At operation 266 the head of the trail can be removed when it is reached. Processing can continue at operation 252. If at operation 254 when anchor R and current anchor C are compared it is determined that anchor R does follow current anchor C, processing can proceed at operation 264. At operation 264 any output can be generated that does not exceed the head of the trail. (It is possible that no output can be generated.) At operation 266 the head of the trail can be removed when it is reached. Processing can continue at operation 252. At operation 256, when current anchor C is compared with anchor R, in response to determining the current anchor C does not follow anchor R, current anchor C, anchor R and current anchor C can be added to the trail and the current anchor C can be set to anchor R. At operation 262 the last checkpoint before the current anchor C can be found and loaded (e.g., into memory). At operation 264 any output can be generated that does not exceed the head of the trail. (It is possible that no output can be generated.) At operation 266 the head of the trail can be removed when it is reached. Processing can continue at operation 252.

In conclusion, disclosed herein includes a system comprising at least one processor, a memory connected to the at least one processor of a computing node and at least one program module comprising a stream processing program module, the stream processing program module performing stream processing of at least one data stream using a pull-based methodology that guarantees once and only once processing of data by using a plurality of anchors, wherein an anchor of the plurality of anchors describes a point in the at least one data stream, so that each unit of data in the at least one data stream is either before or after the anchor. The system may generate the anchor, the anchor comprising a first part comprising a transient description of a current point in a data stream used for normal processing and a second part comprising a durable description of the current point used for recovery processing. The anchor may comprise a physical aspect of the at least one data stream. The anchor may comprise a list of anchors. Recovery may proceed by following a trail comprising a sequence of anchors. The system may comprise at least one program module that generates a time associated with the anchor, the time representing a logically-meaningful time value that establishes a relationship between the anchor and at least one time associated with at least one unit of data in the data stream. The system may comprise at least one program module that partitions a stream of data into two portions: units of data that came before the anchor, and units of data that came after the anchor.

Disclosed herein includes a method comprising performing pull-based stream processing of at least one data stream by at least one processor of a computing device and guaranteeing once and only once processing of data in the at least one data stream by using a plurality of anchors, wherein an anchor of the plurality of anchors describes a point in the at least one data stream, so that each unit of data in the at least one data stream is either before or after the anchor. The method may include generating the anchor, the anchor comprising a first part comprising a transient description of a current point in a data stream used for normal processing and a second part comprising a durable description of the current point used for recovery processing. The method may include generating the anchor, the anchor comprising a physical aspect of the at least one data stream. The method may include generating the anchor, the anchor comprising a list of anchors. The method may include generating a time associated with the anchor, the time representing a logically-meaningful time value that establishes a relationship between the anchor and at least one time associated with at least one unit of data in the data stream. The method may include creating a trail of anchors to enable recovery from a failure of a computing device by executing along the trail of anchors by following from one anchor to a next anchor in the trail of anchors. The method may include retrieving output produced from a node associated with the next anchor in the list and depositing the output into an output buffer with a current anchor. The method may include generating a trail of anchors to enable recovery from a failure by executing along the list of anchors by following from one anchor to a next anchor in the trail of anchors. The method may include initializing at a first anchor in the list of anchors using a checkpoint.

Disclosed herein includes a computer-readable storage medium comprising computer-readable instructions which when executed cause at least one processor of a computing device to perform stream processing of at least one data stream using a pull-based methodology that guarantees once and only once processing of data by using a plurality of anchors, wherein an anchor of the plurality of anchors describes a point in the output stream of a computing device, so that each event in the data stream is either before or after the anchor. Instructions on the computer-readable storage medium may include setting anchors in a trail of anchors, the trail of anchors used in recovery from a failure of the computing device, by reading a data stream from a start anchor and in response to determining that the start anchor has not been encountered yet, generating output for the data stream starting at the point identified by the start anchor. Instructions on the computer-readable storage medium may include in response to determining that the trail of anchors is empty, adding the start anchor to the trail of anchors. Instructions on the computer-readable storage medium may include setting anchors in a trail of anchors. Instructions may include in response to determining that no anchor in the trail of anchors precedes the start anchor, inserting the start anchor prior to a first anchor in the trail of anchors. Instructions on the computer-readable storage medium may include setting anchors in a trail of anchors. Instructions on the computer-readable storage medium may include in response to determining that the start anchor follows a last anchor in the trail of anchors, appending the start anchor to the trail of anchors. Instructions on the computer-readable storage medium may include setting a current anchor based on a latest checkpoint. Instructions on the computer-readable storage medium may generate output, wherein the generated output does not exceed a first anchor in the trail of anchors.

Example of a Suitable Computing Environment

Figure 3:
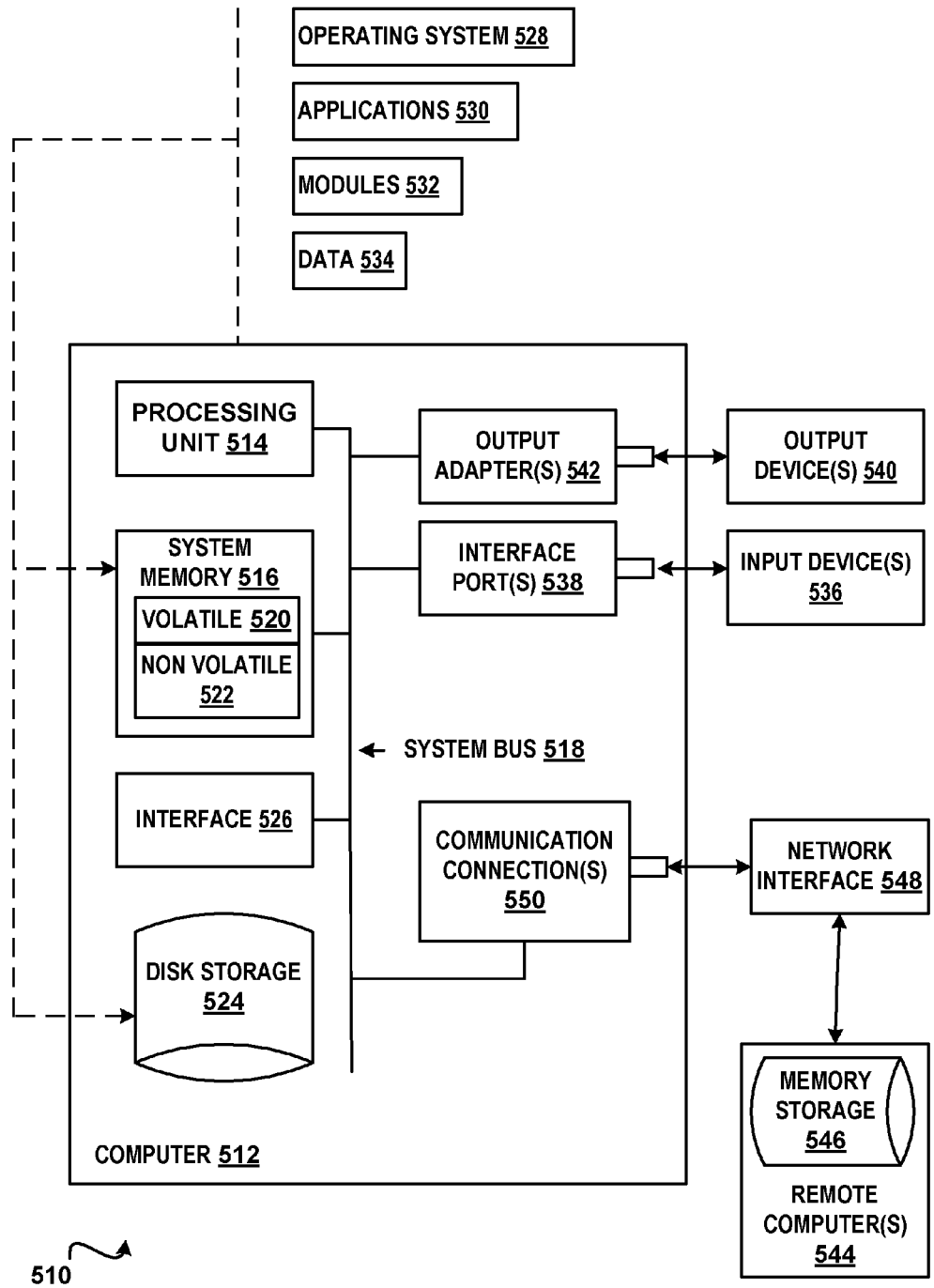
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a memory connected to the at least one processor of a computational node;
   wherein the at least one processor is configured to perform stream processing of at least one data stream using a pull-based methodology where data in the at least one data stream is processed only once by an output node, the output node pulls data from the at least one data stream from an input node by using an anchor, the input node receives the at least one data stream,
   wherein the anchor describes a point in the at least one data stream such that each unit of data in the at least one data stream before the anchor has been processed by the output node and that each unit of data in the at least one data stream after the anchor has not been processed by the output node,
   wherein the anchor is used by the output node to control data received by the output node from the at least one data stream,
   wherein the output node generates the anchor to represent data in the at least one data stream that has already been processed, and
   wherein the stream processing produces an output stream including the requested data from the at least one data stream based on the anchor.

2. The system of claim 1, wherein the anchor comprises a first part comprising a transient description of a current point in a data stream used for normal processing and a second part comprising a durable description of the current point used for recovery processing.

3. The system of claim 1, wherein the anchor comprises a physical aspect of the at least one data stream.

4. The system of claim 1, wherein the anchor comprises a list of anchors.

5. The system of claim 1, wherein recovery proceeds by following a trail comprising a plurality of ordered anchors.

6. The system of claim 1, wherein the at least one processor is further configured to generate a time associated with the anchor, the time representing a logically-meaningful time value that establishes a relationship between the anchor and at least one time associated with at least one unit of data in the at least one data stream.

7. A method comprising:
   performing pull-based stream processing of at least one data stream by at least one processor of a computing device of an input node that receives the at least one data stream by servicing requests for data from the at least one data stream from a requesting node using an anchor contained in a request, wherein the anchor describes a point in the at least one data stream such that each unit of data in the at least one data stream before the anchor has been processed by the requesting node and that each unit of data in the at least one data stream after the anchor has not been processed by the requesting node, wherein the anchor is used by the requesting node to control data received by the requesting node, wherein the requesting node generates the anchor; and
   generating, by the input node, an output stream including the requested data from the at least one data stream based on the anchor from the requesting node such that the output stream does not include data from the at least one data stream that has been already processed by the requesting node.

8. The method of claim 7, wherein the anchor comprises a first part comprising a transient description of a current point in a data stream used for normal processing and a second part comprising a durable description of the current point used for recovery processing.

9. The method of claim 7, further comprising:
generating the anchor, the anchor comprising a physical aspect of the at least one data stream.

10. The method of claim 7, further comprising:
generating the anchor, the anchor comprising a list of anchors.

11. The method of claim 7, further comprising:
generating a time associated with the anchor, the time representing a logically-meaningful time value that establishes a relationship between the anchor and at least one time associated with at least one unit of data in the at least one data stream.

12. The method of claim 7, further comprising;
creating a trail of anchors to enable recovery from a failure of the computing device by executing along the trail of anchors by following from one anchor to a next anchor in the trail of anchors;
retrieving output produced from a node associated with the next anchor in a list and depositing the output into an output buffer with a current anchor;
generating a trail of anchors to enable recovery from a failure by executing along the list of anchors by following from one anchor to a next anchor in the trail of anchors; and
initializing at a first anchor in the list of anchors using a checkpoint.

13. A device, comprising:
at least one processor and a memory;
the at least one processor configured to:
perform pull-based stream processing of at least one data stream by at least one processor of a computing device of an input node by servicing requests for data from the at least one data stream using an anchor contained in a request from a requesting node, wherein the anchor describes a point in the at least one data stream such that each unit of data in the at least one data stream before the anchor has been processed by a requesting node and that each unit of data in the at least one data stream after the anchor has not been processed by the requesting node, wherein the anchor is used by the requesting node to control data received by the requesting node, wherein the anchor is generated by the requesting node; and
generate, by the input node, an output stream including the requested data from the at least one data stream based on the anchor from the requesting node such that the output stream does not include data from the at least one data stream that has been already processed by the requesting node.

14. The device of claim 13, wherein the at least one processor is further configured to:
set anchors in a trail of anchors, the trail of anchors used in recovery from a failure of the computing device, by reading a data stream from a start anchor; and
in response to determining that the start anchor has not been encountered yet, generate output for the data stream starting at the point identified by the start anchor.

15. The device of claim 14, wherein the at least one processor is further configured to:
in response to determining that the trail of anchors is empty, add the start anchor to the trail of anchors.

16. The device of claim 14, wherein the at least one processor is further configured to:
in response to determining that no anchor in the trail of anchors precedes the start anchor, insert the start anchor prior to a first anchor in the trail of anchors.

17. The device of claim 14, wherein the at least one processor is further configured to:
in response to determining that the start anchor follows a last anchor in the trail of anchors, append the start anchor to the trail of anchors.

18. The device of claim 14, wherein the at least one processor is further configured to:
set a current anchor based on a latest checkpoint.

19. The device of claim 14, wherein the at least one processor is further configured to:
generate output, wherein the generated output does not exceed a first anchor in the trail of anchors.

* * * * *